July 26, 1932.  T. C. SCHENK  1,868,918
LAWN MOWER
Filed Feb. 26, 1931
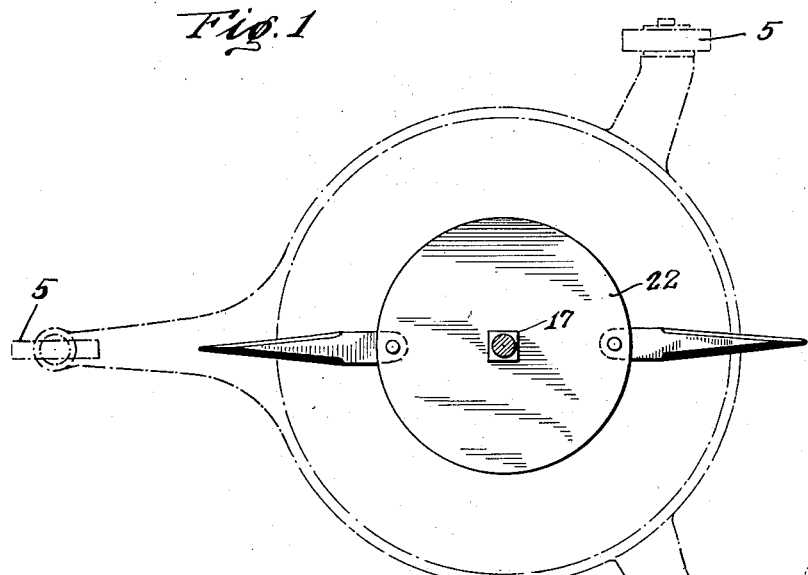
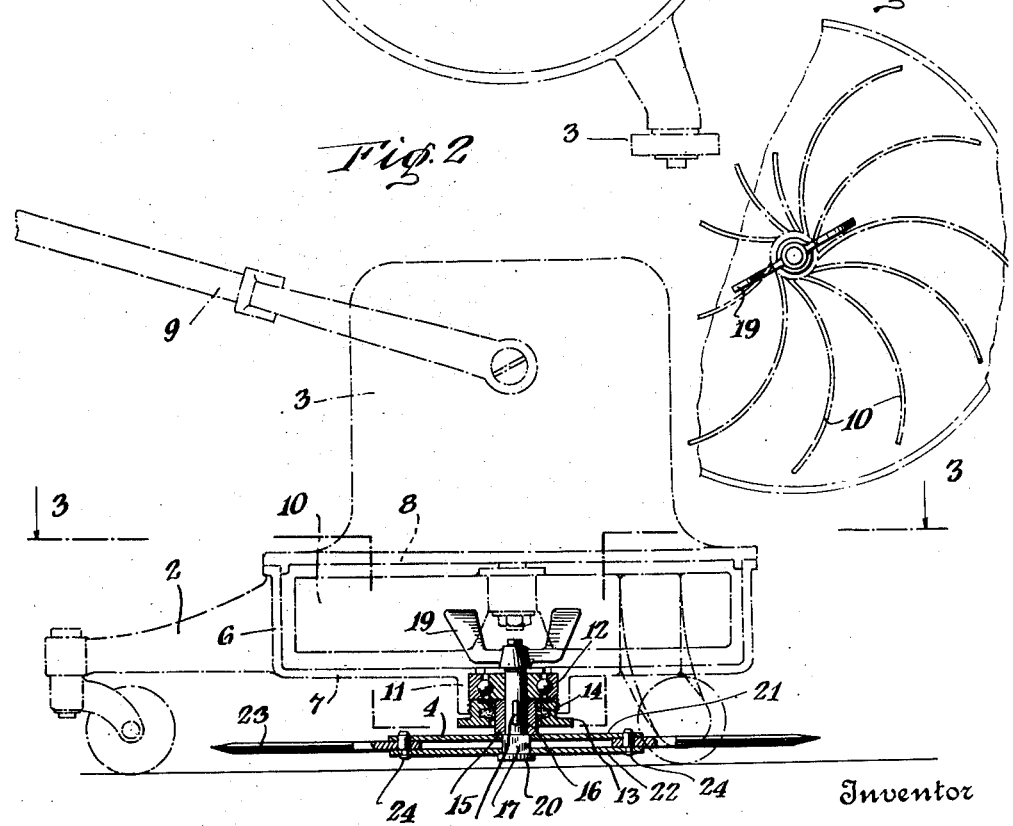
Inventor
Tamis C. Schenk
By his Attorney Patented July 26, 1932

1,868,918

UNITED STATES PATENT OFFICE

TAMIS C. SCHENK, OF BROOKLYN, NEW YORK

LAWN MOWER

Application filed February 26, 1931. Serial No. 518,354.

The object of my invention is to provide a lawn mower which is composed of a frame on castors or rollers which supports the motor and motor casing of a vacuum cleaner, and carries a cutting knife with peculiar features, which is driven by the motor above described. This object is accomplished by my invention, one embodiment of which is hereinafter more particularly set forth.

For a more detailed description of my invention, reference is to be had to the accompanying drawing, forming a part hereof, in which Figure 1 is an inverted plan view of my improved lawn mower;

Figure 2 is a side elevation of the same; and

Figure 3 is a sectional view taken on the lines 3—3 of Figure 2, looking in the direction of the arrows.

Throughout the various views of the drawing, similar reference characters designate similar parts.

My improved lawn mower 1 has a carriage 2 which supports a motor and motor casing, designated by the character 3, such as is found in an ordinary vacuum cleaner, and the cutting mechanism 4 which has novel features as will hereinafter more particularly appear.

The carriage 2 may have as many rollers or castors 5 as desired, but preferably has three arranged as shown, these being found sufficient for the purposes of this apparatus, and it is obvious that they may be made adjustable if so desired, so as to give the cutting blades of the mower any desired elevation.

As the structure for elevation or depression is obvious, a description is unnecessary. The carriage 2 has a cylindrical chamber surrounded by walls 6 and a bottom 7, and the top of this chamber is closed by the casing 8 of the motor casing, which contains the motor of an ordinary vacuum cleaner, and the casing in turn carries the usual handle 9 by which the apparatus may be shifted.

When not used, the casing 8 and the handle 9 are taken out together from the vacuum cleaner and there is also taken out the motor with its shaft and the fan blades 10, all of which are found in the usual manner. The chamber surrounded by the walls 6 is ample to receive these fan blades 10. In the center of the floor 7 of this chamber is a hole and below is a flange 11 which extends downwardly and is adapted to receive a ball bearing 12 of the conventional kind, which is held in place by suitable bushing 13, and in this bushing may be provided a suitable packing 14 of the conventional kind. This packing bears against a sleeve 15 of a vertical stud shaft 16, which has a squared lower end 17 for a purpose that will appear below. The shaft 16 is provided with a key slot 18 which is adapted to receive a key or other suitable means so as to force the sleeve 15 to turn therewith with the same angular velocity as the shaft 16. The upper end of the shaft 16 has a wing nut 19 which is mounted in any suitable way as on screw threads, and the wing nut 19 is adapted to engage the fan 10 and be driven thereby, so that the shaft 16 has the same angular velocity as the fan 10 or the motor which is concealed in the casing 8.

The lower end of the shaft 16 is provided with a suitable nut or other suitable means 20 which carries two parallel discs 21 and 22 which discs have square center openings so as to fit on the square part 17 of the shaft 16. These discs are separated by the thickness of the blades 23 which are pivotally mounted on pivots 24 which are fixed in the lower disc 22 and pass through suitable openings in the disc 21.

As many of these knives 23 may be employed as desired, although two have been found to be sufficient. It is necessary to employ them so that one will counterbalance another as the shaft 16 is driven at something like ten thousand revolutions a minute, or any other suitable speed such as is common with motors of the kind in question. The knives 23 turn freely on the pivots 24 so that if a stone or other obstruction is encountered by them, they simply fall back and pass, so that centrifugal force restores them to the radial position shown in Figures 1 and 2. The great speed at which these knives are driven causes them to cut grass with a clean cut whether they be dull or sharp.

In view of the foregoing, the operation of my improved lawn mower will be readily understood. Assuming the parts to be assembled as shown and the motor properly connected to a source of electrical power, the shaft 16 is driven at the normal velocity of the armature shaft of the motor with the result that the knives 23 are driven at a very high speed and, as the carriage 2 is trundled over the ground, these knives cut grass as rapidly as reached, with a smooth and even cut, which is continued as long as the lawn mower is in use. It is put out of use by shutting off the current.

While I have shown and described one embodiment of my invention, it is obvious that it is not restricted thereto but that it is broad enough to cover all structures that come within the scope of the annexed claims.

Having thus described my invention, what I claim is:

1. In a device of the class described, a shaft, spaced discs mounted on said shaft, knives pivotally mounted between the discs, and means for driving the discs at a high speed so that knives will be maintained in a radial position by centrifugal force.

2. In a device of the class described, a shaft, pivots held in fixed relation to the shaft and cutters pivotally mounted on the pivots, and means for driving the shaft at a high angular velocity so that the knives will be maintained in a radial position by centrifugal force.

3. In a device of the class described, a shaft with an end out of round, a pair of spaced discs held on said end, and driven by said shaft, pivots passing from one disc to another and a knife on each pivot held between said discs, and means for driving said shaft with a high angular velocity so that knives will be maintained in a radial position by centrifugal force.

In testimony whereof, I have hereunto set my hand this 14 day of February, 1931.

TAMIS C. SCHENK.